United States Patent Office 3,118,922
Patented Jan. 21, 1964

3,118,922
METHOD OF PREPARING ORGANIC ISOCYANATES
Sigurd Hartung, Cologne-Mauenheim, Erich Klauke, Leverkusen, and Herbert Schwarz, Opladen, Germany, assignors to Farbenfabriken Bayer Aktiengesellschaft, Leverkusen, Germany, a corporation of Germany
No Drawing. Filed Mar. 2, 1960, Ser. No. 12,248
Claims priority, application Germany Mar. 3, 1959
2 Claims. (Cl. 260—453)

This invention relates to aromatic isocyanates and to a method of preparing the same. More particularly it relates to a method for preparing substituted aromatic isocyanates wherein the substituent is an aliphatic or cycloaliphatic radical which may contain ethylenic unsaturation and/or other hetero atoms such as ester and ether linkages.

It is known that aromatic hydrocarbons such as benzene or phenols may be alkylated with olefins in the presence of Friedel-Crafts catalysts. In this procedure alkyl radicals become directly bonded to the benzene nucleus by the replacement of a hydrogen atom. Materials useful for accomplishing this reaction are aluminum chloride, stannic chloride, zinc chloride, phosphoric acid or sulphuric acid.

This method of alkylating aromatic compounds is inapplicable when the aromatic compound contains an isocyanate group. In the presence of a Friedel-Crafts catalyst, the isocyanate group participates in the reaction as an acylation component and as a result, benzoylanilides are predominately obtained as the reaction product. Consequently, substituted aromatic isocyanates have been prepared heretofore almost exclusively by first alkylating an aromatic amine and then phosgenating the amine. This process not only limits the particular products which may be obtained, but is expensive because of the equipment which is necessary and because of the manner in which the reaction is carried out.

It is, therefore, an object of this invention to provide an improved method for making substituted aromatic isocyanates. It is another object of this invention to provide a method for alkylating aromatic isocyanates. It is a further object to provide a method of making substituted aromatic isocyanates which were heretofore unavailable by known processing techniques. It is still another object of this invention to produce substituted aromatic isocyanates by an alkylation procedure wherein the substituent is joined directly to an aromatic nucleus which contains at least one isocyanate group.

The foregoing objects and others which will become apparent from the following description are accomplished in accordance with the invention, generally speaking by alkylating an aromatic isocyanate in the presence of hydrofluoric acid. More particularly, this invention contemplates reacting an aliphatic ethylenically unsaturated organic compound with an aromatic isocyanate in the presence of hydrofluoric acid.

It is unusual that the reaction between the ethylenically unsaturated aliphatic organic compound and the aromatic isocyanate occurs so smoothly in the presence of hydrofluoric acid while benzoylanilides result when using Friedel-Crafts catalysts such as aluminum chloride. In actual practice, the reaction between the aliphatic ethylenically unsaturated compound and the aromatic isocyanate proceeds smoothly in the presence of hydrofluoric acid to produce the substituted aromatic isocyanate. This is no evidence whatsoever of the isocyanate group participating in the reaction. This method of preparation permits not only the production of a larger number of aliphatic substituted aromatic isocyanates in a simpler manner than was heretofore possible when starting from the corresponding amine, but also permits the production of heretofore unavailable isocyanates such as, for example, hex-5-enyl phenyl isocyanate. The process of this invention specifically involves the preparation of an aliphatic substituted aromatic isocyanate which involves reacting in the presence of hydrofluoric acid an aliphatic ethylenically unsaturated organic compound with an isocyanate. The hydrofluoric acid is present in an amount of at least an equimolar amount of the isocyanate used. It is preferred that the aliphatic ethylenically unsaturated organic compound contain up to about 18 carbon atoms and selected from the group consisting of ethylenically unsaturated aliphatic hydrocarbons and substituted ethylenically unsaturated aliphatic hydrocarbons. The substituted ethylenically unsaturated aliphatic hydrocarbon may have substituents selected from the group consisting of nitro groups, chlorine atoms, lower carboalkoxy groups and lower alkoxy groups. The isocyanate used is an aryl wherein the isocyanato radical is linked directly to the nucleus and is substituted by a member selected from the group consisting of hydrogen, chlorine and lower alkyl.

In accordance with this invention any monovalent or polyvalent aromatic isocyanate which contains at least one hydrogen atom bonded to an aromatic ring carbon atom can be used such as, for example, isocyanates having only one benzene ring in the molecule or having a plurality of aromatic rings or even condensed rings such as naphthylene, anthracene and the like including monoisocyanates such as for example, phenyl isocyanate, toluyl isocyanate, chlorophenyl isocyanate, cumyl isocyanate, alpha-naphthyl isocyanate, beta-naphthyl isocyanate, 4-isocyanato diphenyl and the like; aromatic diisocyanates such as, for example, 2,4-toluylene diisocyanate, 2,6-toluylene diisocyanate, m-phenylene diisocyanate, p-phenylene diisocyanate, 3,3'-dimethyl 4,4'- diphenylene diisocyanate, 3,3'-dimethylethoxy-4,4'-diphenylene diisocyanate, 4,4'-diphenylene diisocyanate, 1,5-naphthylene diisocyanate, 1,4-naphthylene diisocyanate and the like; aromatic triisocyanates such as, for example, 1,2,4-benzene triisocyanate, 4,4',4'''-triphenyl methane triisocyanate and the like; aromatic tetraisocyanates such as, for example, 4,4', 4'', 4'''-tetraphenyl methane tetraisocyanate and the like.

Any aliphatic organic compound containing ethylenic unsaturation may be used in the reaction with the aromatic isocyanate in the alkylation step of the procedure in accordance with this invention. The only other requirement necessary for the aliphatic ethylenically unsaturated compound is that it contain no groups which are reactive with isocyanate groups. In other words, the aliphatic compound should contain no active hydrogen containing groups such as, for example, amines, hydroxyl, carboxylic, mercapto, urethane or urea groups, all of which are capable of reacting with the isocyanate group of the aromatic compound. Of course the ethylenically unsaturated compounds may contain nitro groups, halogen atoms, ester groups or ether groups. The process is applicable utilizing a great variety of ethylenically unsaturated compounds of widely varying types and properties. Although any suitable aliphatic ethylenically unsaturated compound may be used, it is preferred that they have a molecular weight below about 300. Suitable compounds include such as, for example, aliphatic ethylenically unsaturated hydrocarbons which generally occur in cracked petroleum oils such as, for example, propylene, butylene, isobutylene, ethylene, pentene, trimethyl methylene, heptene, octene, diisobutene and higher aliphatic ethylenically unsaturated compounds containing up to 18 or more carbon atoms for example, decenes, isododecylene, hexadecenes, eicosene, triacontylene and the like; alicyclic terpenes such as, camphene, bornylene, dipentene, carene, frenchene, pinene and the like; halogen substituted ethylenic compounds such as allyl chloride, methallyl chloride and the like; nitro substituted ethylenic compounds such as 2-nitro-propene and the like; unsaturated acid esters prepared by reacting unsaturated acids such as, for example, oleic acid, acrylic acid, methacrylic acid, crotonic acid, undecylenic acid and the like with alcohols such as, for example, methanol, ethanol, propanol, butanol, amyl alcohol and the like; compounds containing hetero atoms such as, for example, mesityl oxide, ethers containing ethylenic unsaturation such as, for example, ethyl vinyl ether, ethyl propenyl ether and the like; compounds containing more than one ethylenically unsaturated groups such as, for example, hexa-1,5-diene, butadiene, 2-methyl-1,3-butadiene and the like; alicyclic compounds containing ethylenic unsaturation such as, for example, cyclohexene, cyclobutene, cyclobutylene, cyclohexadiene, cycloheptene, cyclopentene and the like; aromatically substituted alkylenes such as styrene and α-methylstyrene. Aliphatic unsaturated hydrocarbons, however, are preferred.

The hydrofluoric acid utilized in accordance with this invention is preferably anhydrous hydrofluoric acid. However, commercially available technical hydrofluoric acid containing 98 to 99% hydrogen fluoride may be used. The hydrofluoric acid is employed at least in equal molar ratio to the aromatic isocyanate. The hydrofluoric acid may be present in a relatively large excess which may vary as high as 5 to 10 times the molar quantity equal to that of the isocyanate.

The reaction between the aforesaid compounds may be carried out at any desired temperature either in an organic solvent or in the absence of an organic solvent. Suitable solvents such as, for example, nitrobenzene, dinitrobenzene, dialkyl ether, halogenated aliphatic hydrocarbons may be used if desired. The temperature at which the reaction may be carried out may vary from about −50° C. and as high as about 200° C. It is advisable, however, to operate at approximately room temperature and with particular advantage below the boiling point of the hydrofluoric acid. A particularly suitable and the preferred temperature range for carrying out the reaction of this invention is from about −20° C. to about 20° C.

As stated previously, the reaction proceeds very smoothly. In fact the reaction proceeds so smoothly that higher alkyl substituted products of the aromatic isocyanates are formed as well as the monosubstituted products. That is, the alkylation procedure occurs to more than one aromatic ring carbon atom. If it is desirable to obtain the largest possible yield of monosubstituted products, the isocyanate should be used in excess over the aliphatic ethylenically unsaturated compound. The yield of higher alkylation products increases as the ratio of the aliphatic ethylenically unsaturated compound to the aromatic isocyanate increases.

As an illustration of the control over the substituted products which is achieved by controlling the ratio of the quantities of the original reactants, the following is presented. If phenyl isocyanate is reacted with propylene in a molar ratio of 1:1, monoisopropylphenyl isocyanate is obtained in a yield of approximately 30% and the dialkylation products in a yield of about 35%. The remainder of the product consists of high homologues and resin residues. If the molar ratio of the phenyl isocyanate to propylene is increased to 12:7, the yield of monoalkylation product is about 73.5% while the yield of dialkylation products is about 7.5%. The remaining 19% is in the form of higher alkylation products and resin residues. On the other hand, if the ratio of the isocyanate to the aliphatic ethylenic unsaturated compound in the original reaction mixture is in the molar ratio of 1:2, the reaction product contains about 20% of monoalkylation products, 40% dialkylation products and 40% of higher alkylation products and resin residues. It has been observed that the substituents are introduced into the aromatic ring in approximately equal parts into the ortho- and para-positions.

After the reaction has run to completion, the hydrofluoric acid and the solvent which may be present are removed for example, by distillation. The residue may then again be dissolved in a suitable organic solvent such as those set forth above and any remaining hydrofluoric acid removed by blowing the solution with carbon dioxide or by fixing with potassium fluoride. The reaction products may then be purified by distillation.

The reaction products of this invention are suitable for use in various applications such as, for example, as a component in the preparation of plastics, dyestuffs and medicines. Suitable uses for reaction products made according to this invention are as intermediate products in the preparation of polyurethane plastics. Final plastic products may be obtained by reacting the products of this invention with organic compounds containing active hydrogen containing groups such as, for example, polyhydric polyalkylene ethers, hydroxyl polyesters, and the like. Valuable products such as, for example, accumulator bladders, O-rings, gears, diaphragms, valve seals, cellular products, and the like may be made. The cellular products are of course, suitable for use in the manufacture of furniture cushions, pillows, sound and weather insulating materials and the like.

The invention is further illustrated by the following examples without being restricted thereto, the parts being by weight unless otherwise specified.

*Example 1*

About 476 parts of phenyl isocyanate are dissolved in about 500 parts of anhydrous hydrofluoric acid, and about 168 parts of propylene are slowly introduced into the solution at about 0° C. The mixture is thereafter stirred for about 12 hours at about 0° C. The hydrofluoric acid is distilled off and the residue taken up in about 1000 parts of chlorobenzene. This solution is heated to about 125° while introducing carbon dioxide, the solvent is distilled off and the remainder is subjected to fractional distillation.

The following analysis of the reaction products resulted.

Cumyl isocyanate: boiling point 110 to 117° C./30 mm. Hg, $n_D^{20}=1.5214$ to 1.5182; yield: 195 parts or 30% isocyanate number 26.17 (26.02).

Diisopropylisocyanate: B.P. 130° C./16 mm. Hg, $n_D^{20}=1.5151$; yield: 225 parts or 35%, isocyanate number 20.62 (20.66).

*Example 2*

About 1428 parts of phenyl isocyanate are dissolved in about 2000 parts of hydrofluoric acid and reacted with about 300 parts of propylene in accordance with Example 1.

There are obtained 845 parts of cumyl isocyanate which is a yield of 73.5% and 85 parts of diisopropylphenyl isocyanate, a yield of 7.5%.

*Example 3*

About 476 parts of phenyl isocyanate are reacted in about 500 parts of hydrofluoric acid with about 218 parts of cyclohexene as in Example 1. There are obtained 450 parts of hexahydrodiphenyl isocyanate which is a yield of 66% of theoretical: B.P. 135.5° C./6 mm. Hg, $n_D^{20}$ 1.5444, isocyanate number 20.7 (20.9).

*Example 4*

About 507 parts of 1-naphthyl isocyanate are reacted in about 500 parts of hydrofluoric acid with about 84 parts of propylene in accordance with Example 1. There are obtained 170 parts of isopropyl-1-naphthyl isocyanate which is a yield of 40% of theoretical: B.P. 152 to 161° C./3 mm. Hg, isocyanate number 19.4 (19.8).

Example 5

About 476 parts of phenyl isocyanate in about 500 parts of hydrofluoric acid are reacted according to Example 1 with about 102.5 parts of n-hexa-1,5-diene. There are obtained 125 parts by weight of hex-5-phenyl isocyanate which is a yield of 50% of theoretical: B.P. 147–153° C./16 mm. Hg, $n_D$ 1.5338, isocyanate number 21.0 (20.9).

Example 6

About 42 parts of propylene are incorporated while stirring over a period of about 4 hours and at a temperature of about —3° C. into about 30 parts of m-chlorophenyl isocyanate in about 400 parts of hydrofluoric acid. By following the procedure in accordance with Example 1, there are obtained 145 parts of isopropyl-m-chlorophenyl isocyanate which is a yield of 75% of the theoretical: B.P. 128 to 134° C./14 mm. Hg, $n_D^{20}$ 1.5410, isocyanate number 21.5 (21.55).

Example 7

About 400 parts of o-toluyl isocyanate are reacted at about —3° C. in about 500 parts of hydrofluoric acid with about 63 parts of propylene in accordance with Example 1. There are obtained 150 parts of cumyl isocyanate which is a yield of 57% of theoretical: B.P. 105° C./14 mm. Hg, $n_D^{20}$ 1.5228, isocyanate number 24.0 (23.98).

Example 8

About 357 parts of phenyl isocyanate are reacted in about 400 parts of anhydrous hydrofluoric acid with about 84 parts of isobutylene, as described in Example 1, for about 4 hours at about —3° C.

There are obtained 200 parts of a tert.-butyl-phenyl isocyanate which is a yield of 50% of theoretical: B.P. 120° C./20 mm. Hg, $n_D^{20}$=1.5282, isocyanate number 24.0 (23.98).

Example 9

About 500 parts of m-phenylene diisocyanate are dissolved in 2 litres of anhydrous hydrofluoric acid at 0° C. To improve the solubility 300 cm.³ of isopropyl chloride are added. About 700 parts of propylene are slowly introduced into the solution at about 0° C. The mixture is thereafter stirred for about 20 hours at about 0° C. The hydrofluoric acid is distilled off in vacuo until the residue becomes solid. After the addition of 500 cm.³ of chlorobenzene vacuum is put on the reaction mixture which is warmed to room temperature. Then, the solution is heated to about 120° C. while introducing carbon dioxide for 15 minutes. The residue is then distilled. 580 parts of a product is obtained having an NCO content of 30% (yield 66%).

By redistillation the 1,3-diisopropyl-4,6-diisocyanate can be obtained in pure form.

Melting point_____ 59–61° C.
Boiling point_____ 152–156° C. at 12 mm. Hg.
NCO content_____ 34.4%.

It will be understood, of course, by those skilled in the art that our invention is not limited to the specific ingredients or to the proportions thereof employed in the illustrative examples. Thus instead of the particular isocyanates and aliphatic ethylenically unsaturated compounds specified in the examples any of those previously set forth in the specification may be used.

Although the invention has been described in considerable detail in the foregoing, in order to properly illustrate the invention, it is to be understood that the purpose of such detail is solely to illustrate the embodiments of the invention and that modifications can be made by those skilled in the art without departing from the spirit and scope of the invention as set forth in the claims.

What is claimed is:

1. A process for the preparation of an aliphatic substituted aromatic isocyanate which comprises:

reacting in the presence of hydrofluoric acid, an aliphatic ethylenically unsaturated organic compound with an isocyanate, said hydrofluoric acid being present in an amount of at least an equimolar amount to said isocyanate used; said aliphatic ethylenically unsaturated organic compound containing up to about 18 carbon atoms and selected from the group consisting of ethylenically unsaturated aliphatic hydrocarbons, and substituted ethylenically unsaturated aliphatic hydrocarbons, wherein the substituents are selected from the group consisting of nitro groups, chlorine atoms, lower carboalkoxy groups and lower alkoxy groups; said isocyanate being an aryl isocyanate wherein the isocyanato radical is linked directly to the nucleus, said nucleus being substituted by a member selected from the group consisting of hydrogen, chlorine and lower alkyl.

2. The process of claim 1 wherein said hydrofluoric acid is present in an amount at least equal to the molar equivalent of the isocyanate present to about 10 times the molar quantity of the isocyanate present.

References Cited in the file of this patent

Buckley et al.: "Chemical Society Journal" (London) (1945), pages 864–5.

Weichert: "Newer Methods of Preparative Organic Chemistry," Interscience Publishers, New York (1948), pages 354–359.

UNITED STATES PATENT OFFICE
CERTIFICATE OF CORRECTION

Patent No. 3,118,922                                      January 21, 1964

Sigurd Hartung et al.

It is hereby certified that error appears in the above numbered patent requiring correction and that the said Letters Patent should read as corrected below.

Column 1, line 68, for "This" read -- There --; column 4, line 48, for "Diisopropylisocyanate" read -- Diisopropylphenylisocyanate --; column 5, line 5, for "hex-5-phenyl" read -- hex-5-enyl-phenyl --; line 7, for "$n_D$" read -- $n_D^{20}$ --.

Signed and sealed this 28th day of July 1964.

(SEAL)

Attest:

ERNEST W. SWIDER                               EDWARD J. BRENNER
Attesting Officer                                     Commissioner of Patents